No. 825,647. PATENTED JULY 10, 1906.
B. M. W. HANSON.
HAND AND POWER CONTROLLED GEARING.
APPLICATION FILED SEPT. 3, 1905.
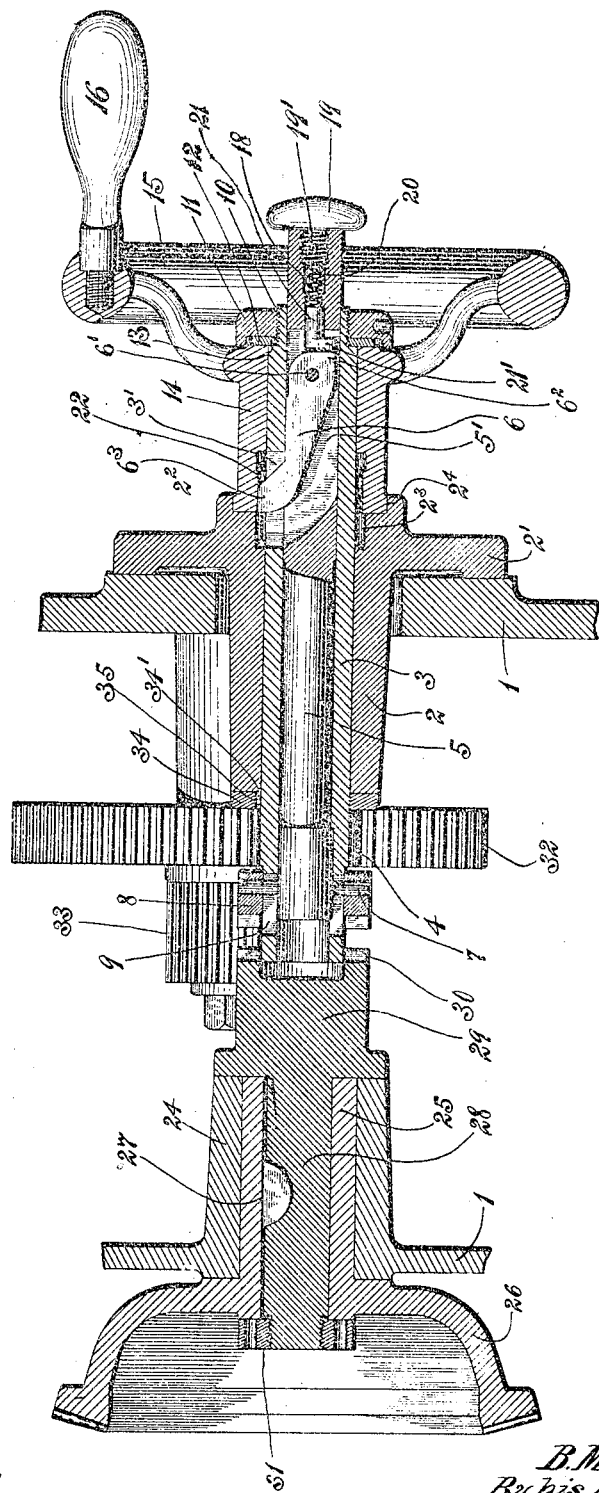
Witnesses.
S. S. Grotta.
F. E. Anderson.
Inventor:
B. M. W. Hanson,
By his Attorney,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

HAND AND POWER CONTROLLED GEARING.

No. 825,647.  Specification of Letters Patent.  Patented July 10, 1906.

Application filed September 8, 1905. Serial No. 277,550.

*To all whom it may concern:*

Be it known that I, BENGT M. W. HANSON, a citizen of Sweden, but having declared my intention of becoming a citizen of the United States, residing at Hartford, in the county of Hartford and State of Connecticut, have invented certain new and useful Improvements in Hand and Power Controlled Gearing, of which the following is a specification.

This invention relates to improved means whereby gearing of any sort may be driven either automatically or by hand and in which the act of disengagement of the manually-operative mechanism engages the driven parts with power mechanism, and when the power-driven mechanism is disengaged the manually-operated devices are thrown into operation.

Primarily the object of the invention is the provision of either hand or power controlled devices and of clutch elements therein, whereby when one clutch is thrown into action the other is disengaged, and vice versa.

A further object of the invention is the provision of details of improvement in mechanism of the class described, which will be hereinafter set forth.

In the accompanying drawing the view is a vertical sectional view of my improved mechanism, certain parts being in elevation, and the machine thus illustrated disclosing one particular arrangement of the improvements with certain driving and driven mechanism; but it is distinctly to be understood that the mechanism shown may be variously modified as the conditions of construction may require.

Like numerals designate similar parts.

Referring to the drawing, the numeral 1 designates a part of a machine-frame of any suitable construction, and 2 a sleeve inserted in an opening of the part 1 and provided with a flange 2'; which may be secured to said part by screws or otherwise. This sleeve is provided at the right of the flange in the construction illustrated with an extension $2^2$, counterbored at $2^3$ to produce an enlarged circular chamber for a purpose hereinafter described, and it also is provided at its end with a rabbet $2^4$ for a purpose hereinafter set forth.

Fitted in the sleeve is a tubular shaft 3, carrying a pinion 4 at its inner end, said shaft being slotted at 3'. Mounted in the tubular shaft 3 is a rod 5, slotted or chambered at 5' to receive a clutch lever or dog 6, which is pivoted to the rod at 6' and has a heel $6^2$ projecting from its pivot and a clutch extension or nose $6^3$. At its inner end the rod 5 is connected by a pin 7 with a clutch 8, said pin working in slots 9 of the shaft. This tubular shaft 3 is threaded at its outer end at 10, and on the threaded portion is fitted a nut 11, having a recess or chamber in its inner face to receive a washer 12, said washer being restrained from rotation on the shaft 3 by a key 13, which fits in a slot in its periphery, but being free for slight movement longitudinally on said shaft when it is actuated by the nut 11. Mounted on the shaft between the nut 11 and the extension $2^2$ of sleeve 2 is the hub 14 of a wheel 15, having a handle 16, by which it may be manipulated, the inner end of said hub being inserted within the rabbet $2^4$ of the extension $2^2$. Normally the hub of the hand-wheel is loose on the shaft 3, and it can be readily engaged and disengaged from said shaft in a manner now to be described.

At its outer projecting end the rod 5 is chambered at 18, and threaded into said chamber is the stem 19' of a knob 19. In said chamber 18 is a spring 20, which bears at one end against the extremity of the threaded stem 19' and at its other end against a pin 21, having an angular extension 21' in engagement with the heel of the clutch lever or dog 6 and serving normally to rock said dog upon its pivot and to throw its clutch end outward. In the hub of the hand-wheel 15 is formed a keyway 22 for the reception of the nose $6^3$ of the clutch dog or lever 6. In the drawing the end of the clutch-lever is shown in engagement with the keyway of the hub and the parts are arranged for the manual transmission of power, the rod 5 being pulled out and the clutch 8 being released from the complemental clutch element with which it is adapted to engage. In a bearing 24 of another part of the frame 1 is mounted the hub 25 of a gear or other element 26, said hub 25 being keyed at 27 to a shaft 28, and said shaft terminating at its inner end in an enlarged flanged head 29, having a clutch-surface 30. At its extreme outer end the shaft 28 is threaded to receive a spanner-nut 31, and said nut and the flange of the head retain the hub 25 and its gear or other element 26 against longitudinal movement in the bearing 24.

In mesh with the pinion 4 on the inner end of shaft 3 is a large spur-gear 32, and rigid with said spur-wheel is a pinion 33, which may be used to drive any desired gear—for instance, a pinion, rack, &c.

In the operation of the invention when the parts are in the position represented in the drawing the hand-wheel is clutched to the shaft 3 and the clutch 8 is disengaged from the complemental clutch 30 on shaft 28, so that by turning said hand-wheel the gear 32 will be driven and the pinion 33 will actuate any desired gear. When, however, the rod 5 is pushed inward, the end of the clutch-dog 6 leaves the spline in the hub of the hand-wheel and enters the circular groove or chamber 2³ in the end of the sleeve 2. This action throws the clutch 8 into engagement with the clutch 30 on the head 19 of the shaft 28, and as the gear 26 is actuated in any suitable manner (not shown) it will be seen that the said gear will drive the shaft 28 and through the connections described the tubular shaft 3, thus starting into operation the gear 32 and pinion 33 and operating the part of the machine to be driven. As will be obvious, when the face of the clutch-dog 6 enters the chamber 2³ in the extension of the sleeve 2 said dog will rotate freely with the shaft 3.

A washer 34 separates the pinion 4 from the end of sleeve 2, and said washer is slotted at 34' to receive a pin 35 of the shaft 3.

Frequently it is necessary in automatic machines to stop the power-driven mechanism and to actuate certain parts by hand, and this may be readily accomplished by the construction shown.

Changes may be made in the various details of the mechanism, the invention not being limited to the precise devices illustrated and described, and this mechanism may be employed with various machines and in various arts without departure from the invention.

Having thus described my invention, what I claim is—

1. The combination, with a shaft, of a hand-wheel, sleeved thereon; a clutch for connecting said hand-wheel with the shaft, and for disconnecting it therefrom; a power-driven element; a second clutch for connecting the shaft and said power-driven element; and means for simultaneously actuating the clutches, to throw one in and the other out of action.

2. The combination, with a tubular shaft, of a manually-operable element sleeved on said shaft; a clutch for connecting said element to and disconnecting it from said shaft; a power-driven element; a clutch for connecting the power-driven element to and disconnecting it from said shaft; means for simultaneously shifting said clutches, to throw one into and the other out of action; and mechanism driven by the shaft when either clutch is in action.

3. The combination, with a tubular shaft, of a hand-wheel sleeved on the shaft; a device movable in the bore of the shaft; a pair of clutch elements actuated by said device, and one of which couples the hand-wheel to and uncouples it from the shaft; and a power-driven device engaged by the other clutch element when the first clutch element is disengaged from the hand-wheel.

4. The combination, with a tubular shaft, of a hand-wheel sleeved on said shaft; and having a clutch-hub; a rod slidable in the bore of the shaft; a pair of clutch elements actuated by said rod; and a power-driven shaft adapted to be engaged by one of said clutch elements when the other clutch element is disengaged from the hub of the hand-wheel.

5. The combination, with a tubular shaft, of a rod movable longitudinally in said shaft; clutch elements carried by the movable rod; a hand-driven device sleeved on and adapted to be connected to the shaft by one of said clutch elements; and a power-driven device adapted to be connected to the shaft by the other of said clutch elements.

6. The combination, with a tubular shaft, having slots, of a rod movable longitudinally in said shaft; clutch elements pivoted to the rod; a hand-driven device surrounding the shaft; and adapted to be engaged therewith by said pivoted clutch elements; a sliding clutch element upon the shaft; a pin carried by the rod, and projecting through slots of the shaft to engage said sliding clutch element; a power-driven shaft, and a clutch element thereon and adapted to be engaged by said sliding clutch element.

7. The combination, with a tubular shaft having a slot adjacent to its outer end, and a pair of slots adjacent to its inner end, of a rod movable longitudinally in said shaft, and also having a slot; a clutch-dog pivoted to the shaft, and movable in said slot; means for normally actuating said clutch-dog to hold it in engaging position; a hand-wheel having a clutch-hub loose on the shaft; a clutch element slidable upon the shaft at the end opposite the clutch-dog; and a power-driven device adapted to be engaged by said clutch element.

8. The combination, with a tubular slotted shaft, of a pinion on said shaft; mechanism actuated by said pinion; a pair of clutch elements carried by the shaft; a rod movable in the bore of the shaft; and connected to said clutch element; a hand-controlled device sleeved on the shaft adapted to be engaged therewith; and a power-driven device adapted to be engaged by the other clutch element.

9. The combination, with a tubular and slotted shaft, of a rod slidable in the bore of said shaft; a clutch-lever pivoted to said rod; a spring-actuated plunger bearing against the heel of said clutch-lever; a hand-wheel having a hub with which the clutch-lever is adapted to engage, said hand-wheel surrounding the shaft; a bearing in which the shaft is mounted, said bearing having a chamber to receive the end of the clutch-lever when said clutch-lever is disengaged from the hub of the hand-wheel; a sliding clutch element actuated by the rod; and a power-driven shaft having a head provided with a clutch-surface with which said sliding clutch element may be engaged.

10. The combination, with a sleeved bearing having a chamber, of a tubular slotted shaft mounted in said bearing; a slotted rod movable longitudinally in the tubular shaft; a clutch-lever pivoted in the slot of the rod; a hand-wheel having a hub, said hub loosely surrounding the shaft; a sliding clutch operated by the rod; and a driven shaft having a clutch-surface with which said sliding clutch is adapted to be engaged.

11. The combination, with a sleeved bearing having a chamber at its outer end and a rabbet adjacent to said chamber; of a tubular and slotted shaft journaled in said bearing; a hand-wheel having a clutch-hub, the end of which is received in the rabbet of the bearing, said hub fixed against displacement on the shaft; a slotted rod movable in the tubular shaft; a clutch-lever pivoted in the slot of the rod; a spring-actuated plunger bearing against the heel of the clutch-lever; a sliding clutch element carried by the opposite end of the rod; a power-driven shaft having a clutch-surface adapted to be engaged by said sliding clutch element; and power-transmitting mechanism actuated by the tubular shaft.

In testimony whereof I affix my signature in presence of two witnesses.

BENGT M. W. HANSON.

Witnesses:
E. C. BENEDICT,
JOEL W. JOHNSON.